Figure 1:
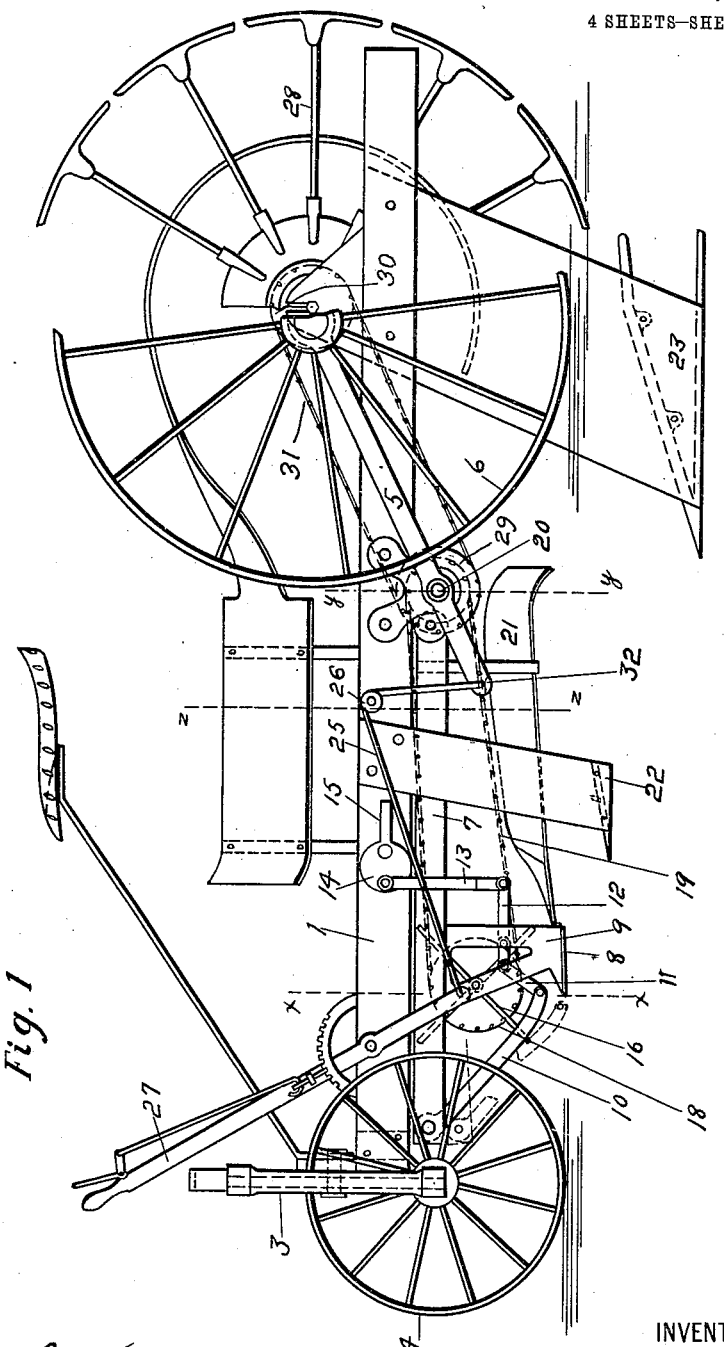

A. F. GLINKE.
BEET HARVESTING MACHINE.
APPLICATION FILED SEPT. 19, 1911. RENEWED DEC. 1, 1913.

1,100,969.

Patented June 23, 1914.

4 SHEETS—SHEET 1.

WITNESSES:
Jos. Rawley
Christine A. Braidel

INVENTOR
August F. Glinke
BY
Geo. B. Willcox ATTORNEY

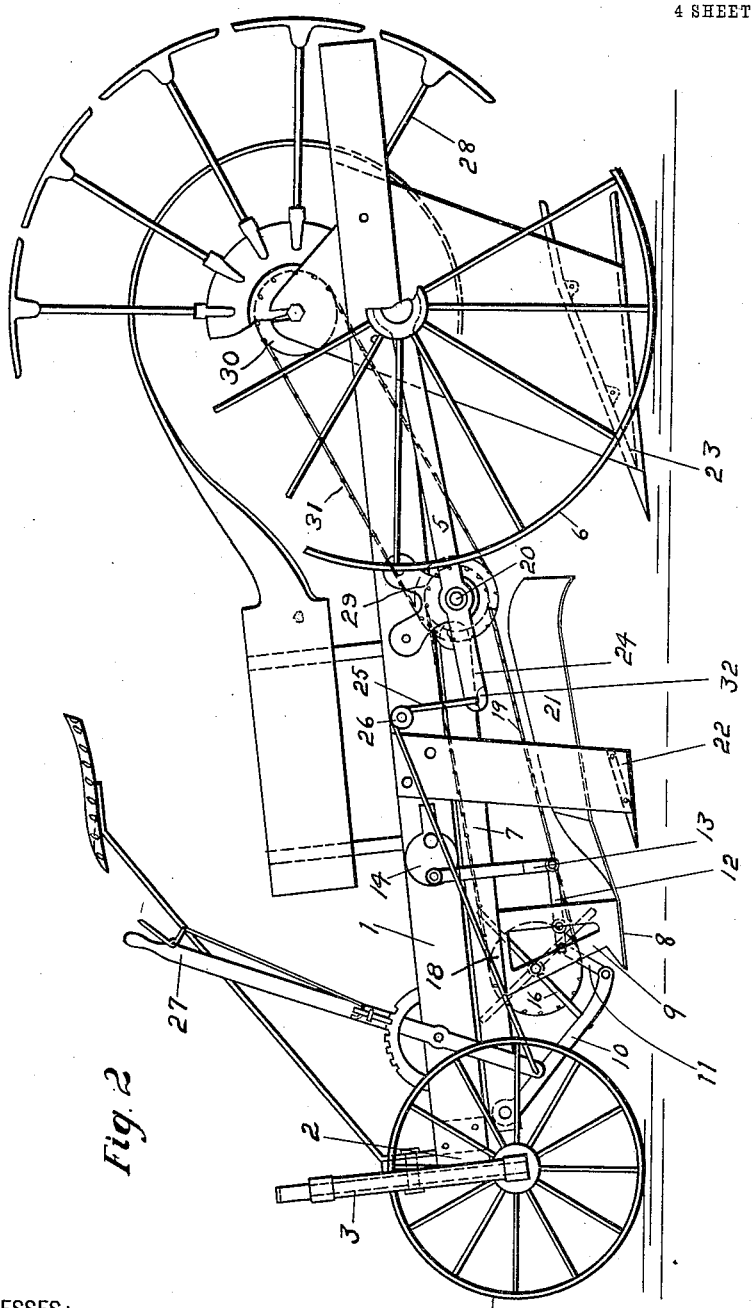

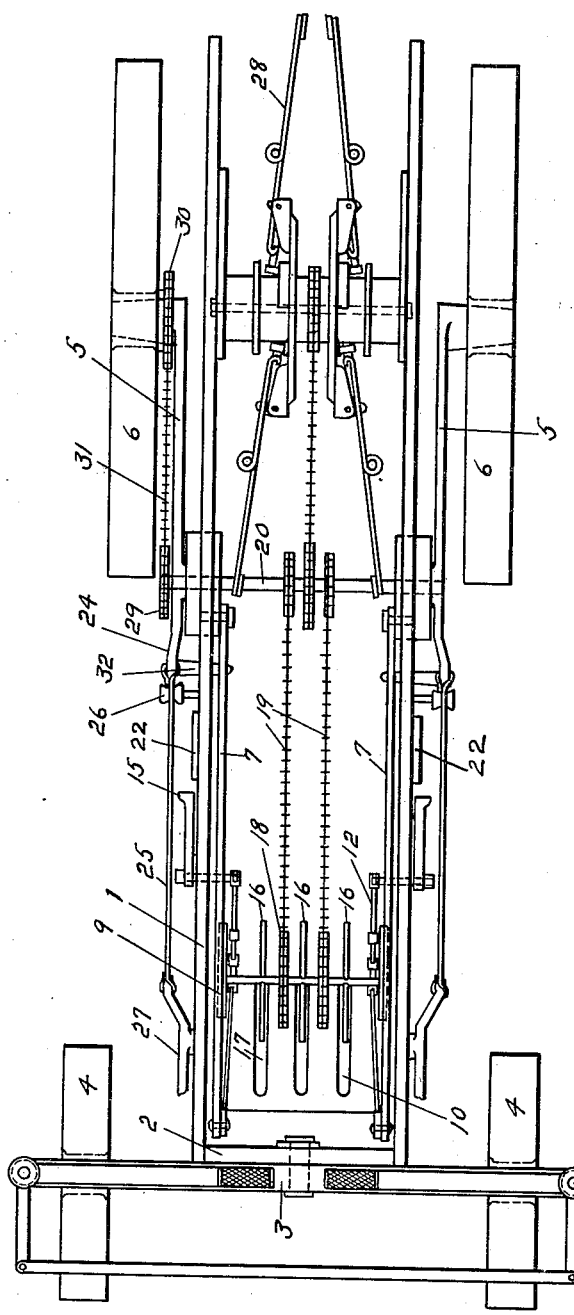

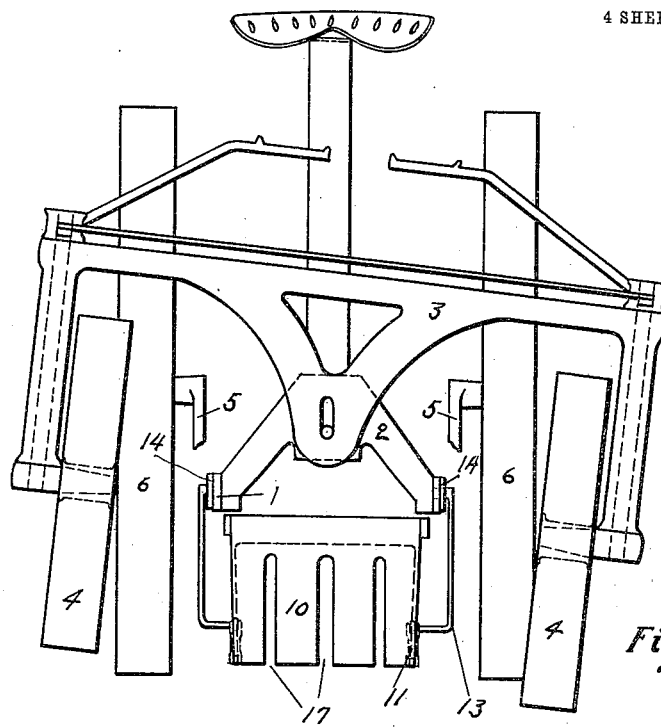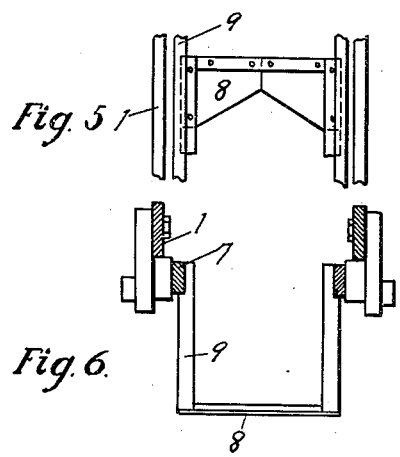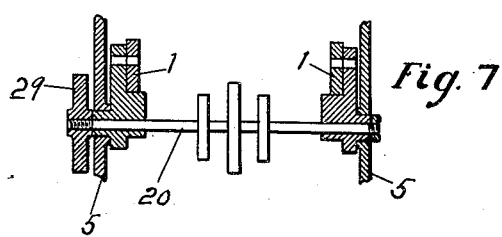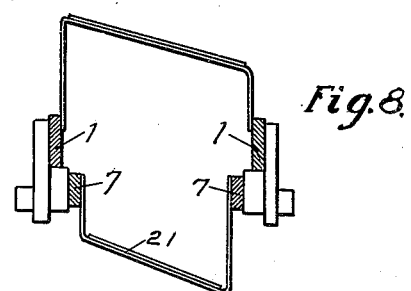

UNITED STATES PATENT OFFICE.

AUGUST F. GLINKE, OF MERRILL, MICHIGAN.

BEET-HARVESTING MACHINE.

1,100,969. Specification of Letters Patent. Patented June 23, 1914.

Application filed September 19, 1911, Serial No. 650,105. Renewed December 1, 1913. Serial No. 803,947.

*To all whom it may concern:*

Be it known that I, AUGUST F. GLINKE, a citizen of the United States, residing at Merrill, in the county of Saginaw and State of Michigan, have invented certain new and useful Improvements in Beet-Harvesting Machines; and I do hereby declare the following to be a full, clear, and exact description of the invention, such as will enable others skilled in the art to which it appertains to make and use the same.

This invention relates to beet harvesting machines and pertains more particularly to that class of harvesting machines which incorporates in a single machine, a topping device for severing the "tops" or waste parts of the beets, a brushing or sweeping device for throwing the severed tops to one side, a subsoiling device for breaking the ground at the sides of the row of beets, a digging device for partly raising the beets out of the ground, and a picking device for picking the beets out of the ground and depositing them at one side of the row.

My present invention pertains more particularly to the topping device and its purpose is to produce a topper having a knife for severing the beet tops, and provided with means by which the height of the knife with relation to the average ground line may be adjusted. I also provide means by which the height of the topping knife will be automatically adjusted so that as it approaches a beet which projects an extraordinary distance above the surface of the ground (and consequently requires to be severed a considerable distance below the crown), the topper will automatically adjust itself to the required conditions.

A further purpose of my invention is to provide improved means for sweeping the severed tops and leaves away from the line of travel of the machine, so as to leave the row clear of tops and permit the picking device to operate upon the beets.

Another purpose of my invention is to provide means whereby the topping device may be lifted clear of the ground when the frame of the machine is raised, for purposes of transportation.

With these and certain other objects in view, which will appear later in the specification, my invention consists in the devices described and claimed, and the equivalents thereof.

In the drawings forming a part of the specifications, Figure 1 is a side elevation of the device broken away in part, with the frame horizontal; Fig. 2 is a similar view showing the frame raised so that the working parts of the machine clear the ground, for purposes of transportation; Fig. 3 is a top plan view; Fig. 4 is a front view of the frame, showing the front wheels tilted as in riding over an obstruction; Fig. 5 is a detail showing the top plan view of the knives; Fig. 6 is a vertical section on the line $x$—$x$ of Fig. 1; Fig. 7 is a part vertical section on the line $y$—$y$ of Fig. 1, showing the main axle of the machine; Fig. 8 is a similar section on the line $z$—$z$ of Fig. 1, showing the arrangement of the aprons by which the tops and beets are deflected to one side of the machine.

The complete machine consists in a topper with means for sweeping the tops away from the row of beets, a sub-soiler for breaking the surface of the ground at the side of the row, a digger, and a picking device for lifting the beets from the ground. All of these devices are carried on a frame supported at its front end by guiding wheels and at its rear end by traction wheels, the connection between the frame and traction wheels being such that the rear end of the frame can be lifted higher than the axis of the traction wheels, so as to lift the topper, the sub-soiler, the digger, and the picker, all clear of the ground.

Referring to the drawings, 1 represents the frame, consisting of two horizontal bars connected together at their front ends by a cross-bar 2 which is pivotally mounted on the front fork 3 of the guiding wheels 4. Toward the rear end of the frame are journaled a pair of rearwardly extending arms 5. Upon the rear of each arm is mounted one of the traction wheels 6. Means, which will presently be described, are also provided for lifting the frame 1 with relation to the traction wheels 6.

Pivoted to the underside of frame 1 is an auxiliary frame which I term the topper frame 7. The forward end of this topper frame has a limited up-and-down movement as indicated by dotted lines in Fig. 1.

On the frame 7 is supported a horizontally disposed topping knife 8 which is connected to the topper frame by means of side brackets 9, to the bottoms of which the knife is rearwardly secured. A regulating shoe 10 is pivoted at its upper end to the front end of the topper frame 7, its lower end lying in the path of the beets to be topped and adapted to ride over the beet leaves and tops as the topping knife 8 approaches them.

The lower end of regulating shoe 10 is connected by means of links 11, levers 12, and connecting links 13 to a pair of eccentrics 14 pivoted to the frame 1. Turning the eccentric 14 by means of its foot piece 15 raises and lowers regulating shoe 10 with relation to the topping knife 8. It will be noticed, however, that eccentric 14 is carried by frame 1, while the topping knife 8 and regulating shoe 10 are carried by the pivotally mounted topping frame 7.

The operation of this part of the device is as follows: If the machine has been set to top a row of beets that are thoroughly embedded in the ground, so as to require the removal of only a small part of the crown, the topping shoe will occupy approximately the position indicated by dotted lines in Fig. 1. If, however, a beet is encountered that projects a considerable distance out of the ground and therefore requires the removal of a considerable portion of its top, the shoe 10 will ride over the projecting top and be lifted thereby, thus also lifting the forward end of topping frame 7 and the topping knife 8. Eccentrics 14 and connecting links 13 remain stationary, and the levers 12 which are pivoted to the side brackets 9, oscillate so as to slightly increase the vertical distance between the cutting edge of knife 8 and the bottom of regulating shoe 10.

It is, of course, evident that the vertical distance between the shoe and the knife determine the amount that will be removed from the upper part of the beet. Thus, as the machine travels forward along the row of beets, the varying amount that the different beets project above the ground automatically regulates the amount that will be cut from the top of the beet, and the frame 7 carrying the topping mechanism will vibrate up and down as the shoe 10 comes in contact with higher or lower beets.

To sweep the beet tops clear of the topping knife, I provide a sweeping device comprising a plurality of sets of radial arms 16 revolubly mounted on the side brackets 9, each set of arms traveling in a slot 17 formed in the shoe 10. I prefer to drive the sweeping arms 16 by means of sprockets 18 and sprocket chains 19, which are in turn driven from the main axle 20 carried by the frame 1. Beneath the chains 19 I provide a suitable apron 21 along which the severed tops are swept by means of the lower strands of the chain 19. The rear end of apron 21 is preferably warped so as to guide the severed tops to one side of the row of beets. To the rear of the topping knife 8 and secured to the frame 1, I may provide a sub-soiler 22 to break the ground at either side of the row of beets. At the rear of the frame is bolted a suitable digging device 23 of any approved construction.

To lift the rear end of the frame 1 for transportation, I provide the following device. The forward ends 24 of arms 5 project beyond the main axle 20 and to each of the forwardly projecting ends 24 is secured a cable or chain 25 passing over a pulley 26 carried by the frame 1 and secured at its opposite end to the lower extremity of a quadrant lever 27 which is also pivoted to the frame 1. When the lever 27 is drawn back, as indicated in Fig. 2, the forward end 24 of lever 5 is raised, thereby raising the frame 1 by means of the main axle 20. By this means the rear end of the frame may be lifted so that the topper, sub-soiler and digger are clear of the ground, or the frame may be lowered so as to vertically adjust the working parts with respect to the ground line.

At the rear of the frame 1 may be mounted a picking device 28 of any suitable construction, but preferably that shown in my co-pending application, Serial No. 651,238, filed Sept. 25, 1911.

In practice I prefer to drive the axle by means of sprockets 29 and 30, mounted respectively on the main axle 20 and on the hub of one of the traction wheels 6, as shown in Fig. 3, the sprockets 29 and 30 being connected by a sprocket chain 31.

To lift the forward end of topper frame 7 when frame 1 is lifted by means of the lever 27, as above described, I provide at the forward ends 24 of arms 5, an inwardly projecting lug 32 adapted to take under the lower edge of frame 7 and to lift it, when arm 5 has been raised, nearly to the top of its travel. By this means the shoe 10 and knife 8 are quickly lifted from the ground just as the rear end of frame 1 reaches the top of its travel.

While I have described my invention as adapted for the topping of beets, it is to be understood that it may equally well be applied to the harvesting of chicory or other roots.

Having described my invention, what I claim and desire to secure by Letters Patent, is:—

1. In a beet harvesting machine, the combination with a main frame, of a topping frame having its rear end pivotally mounted on the main frame, the forward end of said topping frame being capable of a limited up-and-down movement, a rearwardly and downwardly extending regulating shoe pivotally secured to the forward end of said topping frame, said shoe being provided with slots in its lower extremity, downwardly extending brackets secured to the topping frame, a horizontal topping knife fixed to the bottom of said brackets, means connecting the shoe, the brackets and main frame, and adapted to automatically adjust the height of the regulating shoe with relation to the knife; a plurality of sweep-arms revolubly mounted on said brackets and adapted to travel in the slots of said shoe, and means for rotating said sweep-arms.

2. In a beet harvesting machine, the combination with a main frame, of a topping frame pivotally mounted on the main frame, the forward end of said topping frame being capable of a limited up-and-down movement, a rearwardly and downwardly extending regulating shoe pivotally secured to the forward end of said topping frame, said shoe being provided with slots in its lower extremity, downwardly extending brackets secured to the topping frame, a horizontal topping knife fixed to the bottom of said brackets, levers pivoted to said brackets, links connecting the forward ends of said levers to the lower end of the regulating shoe, eccentrics pivoted to the main frame, links connecting said eccentrics with the rear ends of said levers, a plurality of sweep-arms revolubly mounted on said brackets and adapted to travel in the slots of said shoe, and means for rotating said sweep-arms.

3. In a beet harvesting machine, the combination with a main frame, of a topping frame pivotally mounted on the main frame, the forward end of said topping frame being capable of a limited up-and-down movement, a rearwardly and downwardly extending regulating shoe pivotally secured to the forward end of said topping frame, said shoe being provided with slots in its lower extremity, downwardly extending brackets secured to the topping frame, a horizontal topping knife fixed to the bottom of said brackets, levers pivoted to said brackets, links connecting the forward ends of said levers to the lower end of the regulating shoe, eccentrics pivoted to the main frame, links connecting said eccentrics with the rear ends of said levers, a plurality of sweep-arms revolubly mounted on said brackets and adapted to travel in the slots of said shoe, means for rotating said sweep-arms, and means for lifting said topper frame, comprising a main axle carried by said frame, arms secured to said axle, traction wheels mounted on the rear ends of said arms, inwardly projecting lugs carried by the forward ends of said arms and adapted to take under the topping frame, a quadrant lever, and a cable connecting said quadrant lever to the front end of said arms.

In testimony whereof, I affix my signature in presence of two witnesses.

AUGUST F. GLINKE.

Witnesses:
CHRISTINE A. BRAIDEL,
GEO. W. SMITH.

---

Copies of this patent may be obtained for five cents each, by addressing the "Commissioner of Patents, Washington, D. C."